(12) United States Patent
Kaliyaperumal et al.

(10) Patent No.: US 11,080,068 B2
(45) Date of Patent: Aug. 3, 2021

(54) ADAPTIVE USER-INTERFACE ASSEMBLING AND RENDERING

(71) Applicant: Microsoft Technology Licensing, LLC, Redmond, WA (US)

(72) Inventors: PalaniRaj Kaliyaperumal, Redmond, WA (US); Kuralmani Elango, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 161 days.

(21) Appl. No.: 16/022,279

(22) Filed: Jun. 28, 2018

(65) Prior Publication Data

US 2020/0004560 A1    Jan. 2, 2020

(51) Int. Cl.
| | |
|---|---|
| G06F 3/0481 | (2013.01) |
| G06F 9/451 | (2018.01) |
| G06F 16/25 | (2019.01) |

(52) U.S. Cl.
CPC ............ G06F 9/451 (2018.02); G06F 3/0481 (2013.01); G06F 16/252 (2019.01)

(58) Field of Classification Search
CPC ...... G06F 9/451; G06F 3/0481; G06F 16/252; H04L 67/306; H04L 67/10; H04N 1/00501
See application file for complete search history.

(56) References Cited

U.S. PATENT DOCUMENTS

| | | | |
|---|---|---|---|
| 7,558,748 B2 | 7/2009 | Ehring et al. | |
| 8,884,974 B2 | 11/2014 | Dadi et al. | |
| 9,116,710 B2 | 8/2015 | Sullivan et al. | |
| 9,235,429 B1 | 1/2016 | Sharifi Mehr | |
| 9,565,224 B1 * | 2/2017 | Lewis | H04N 21/4312 |
| 2007/0300185 A1 | 12/2007 | Macbeth et al. | |
| 2009/0077164 A1 * | 3/2009 | Phillips | G06Q 10/06 709/203 |
| 2012/0137235 A1 | 5/2012 | Ts et al. | |
| 2012/0233239 A1 | 9/2012 | Urim et al. | |

(Continued)

OTHER PUBLICATIONS

Hanumansetty, Reena G., "Model Based Approach for Context Aware and Adaptive User Interface Generation", In Thesis of Virginia Polytechnic Institute and State University, Jul. 20, 2004, 109 Pages.

(Continued)

*Primary Examiner* — Phuong H Nguyen
(74) *Attorney, Agent, or Firm* — Fiala & Weaver P.L.L.C.

(57) ABSTRACT

Methods, systems, and computer program products are provided for dynamic and adaptive user-interface component selection for rendering in distributed applications. An adaptive user-interface component selection system is enabled to select user-interface components for rendering and display on a client device running an instance of a client application. User-interface components are selected based on a set of applicable component rules. Applicable component rules are determined based on client feedback information that includes information regarding the client including: network bandwidth, geolocation, user role, user context and required application features. Selected user-interface components are transformed into renderable code either locally to the system or remotely at the client device, and rendered and displayed on the client device.

20 Claims, 5 Drawing Sheets

(56) References Cited

U.S. PATENT DOCUMENTS

2013/0044128 A1  2/2013 Liu et al.
2013/0151984 A1  6/2013 Kimball et al.

OTHER PUBLICATIONS

"International Search Report and Written Opinion Issued in PCT Application No. PCT/US2019/038352", dated Sep. 20, 2019, 12 Pages.

* cited by examiner

600

602 Determine, based on the at least one component rule, that the at least one user-interface component should be assembled remotely by the application

604 Based on the determination, transmit templates associated with the at least one user-interface component to the client for assembly, rendering and display by the application

702 Intermittently collect and store additional information regarding the client from the client, the additional information regarding the client reflecting changed operating conditions at the client

704 Retrieve at least one additional component rule from the component rule database based at least in part on the additional information regarding the client, wherein the at least one additional component rule causes greater or fewer user-interface components to be rendered and displayed by the client in response to the changed operating conditions.

802 Identify at least one client cluster comprising a plurality of clients each having substantially similar operating conditions as reflected in the information regarding the client provided by each.

902 Detect whether an additional client device is a member of the at least one client cluster and, in response to the client being a member of the at least one client cluster, select at least one additional component rule from the component rule database, the at least one additional component rule dictating selection of an additional user-interface component different from the at least one user-interface component.

ADAPTIVE USER-INTERFACE ASSEMBLING AND RENDERING

BACKGROUND

Businesses today have grown to rely on distributed application platforms for efficient management of business processes serving a diverse group of users, user devices and user locations. Distributed application platforms enable scalable and reliable delivery of application services and data to connected clients across the globe. Such platforms likewise enable fusion of data from both logically and physically diverse data sets. For example, business supply chain operations may be supported by a distributed supply chain application that provides supply chain planning, sourcing, production and/or delivery services to a diverse set of users and devices. Likewise, many business processes require one or more approvals from various levels of management, many of whom may be in diverse locations around the world.

Of course, not every user of a distributed business application can or necessarily should be provided with the same application services, capabilities or data views as reflected in the client application user-interface. For example, export or other government restrictions may prohibit certain countries from having application access altogether, or restrict data access in some manner. Likewise, different users of the distributed applications may have different rights or permissions, and therefore be presented different application capabilities or data views. Similarly, certain users may be, for example, be making very high priority use of the application platform (e.g. approving a multi-million dollar acquisition), and be afforded with priority service. Additionally, user experience with a distributed application may be impacted by unforeseen and uncontrollable environmental impacts. For example, network congestion between application servers and the user's client device may militate in favor of a light weight user-interface including only the most critical user-interface components.

Ad hoc programming of a distributed business application to account for such priorities and/or constraints, and provide an appropriate user-interface experience would be difficult or impossible. Simply put, hard coded programming solutions for today's business needs may not be suitable for the business realities of tomorrow.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Systems, methods, and computer program products are provided that address issues related to dynamic and adaptive user-interface rendering in distributed applications. In one implementation, an adaptive user-interface component selection system is enabled to select user-interface components for rendering and display on a client device running an instance of the client application. The user-interface components to be included or omitted from the client device user-interface may be selected according to a set of component rules that dictate which user-interface components should or should not be rendered on the client device. The applicable component rules are identified based on information regarding the client device such as, network bandwidth, geolocation, user role, user context or required application features and some or all of such information may be gathered by the client device and intermittently transmitted to the application platform servers. Other component rules may also be applicable and depend on the historical user-interface usage patterns of a user (e.g. depend on what has been viewed, clicked on or otherwise interacted with).

In another example aspect for selecting user-interface components for rendering and display on a client device, a determination is made whether the user-interface components should be assembled locally by the system and transmitted to the client device for immediate rendering, or whether the user-interface components should be transmitted as templates to the user device for remote assembling and rendering by the application executing on the client device.

Embodiments may also, based on information regarding a client device that is intermittently received, detect changed operating conditions at the client (e.g. network bandwidth), and cause the user-interface components selected for rendering to be changed, so as to change the user-interface of the application executing on the client device in adaptation to the changed operating conditions.

In a further aspect for selecting user-interface components for rendering and display on a client device, a cluster of user devices with similar operating constraints (e.g. network bandwidth, geolocation, user role, user context or required feature) is identified, and a set predetermined component rules are associated therewith based on those constraints. Subsequent connection by a client device determined to be a member due to having similar operating constraints of the cluster results in the predetermined component rules being applied without the necessity of first gathering information regarding the client device, and user-interface components dictated by those rules are selected for rendering and display on the application executing on the user device.

Further features and advantages of the invention, as well as the structure and operation of various embodiments, are described in detail below with reference to the accompanying drawings. It is noted that the embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 6 shows a flowchart of an example method of user-interface component assembling performed by a remote client device, according to an example embodiment.

FIG. 7 shows a flowchart of a method for detecting changed operating conditions at a client, and thereby causing new user-interface components to be selected, according to an example embodiment.

FIG. 8 shows a flowchart of a method for identifying client clusters, according to an example embodiment.

FIG. 9 shows a flowchart of a method for detecting client cluster membership of a client device, according to an embodiment

Figure 1:
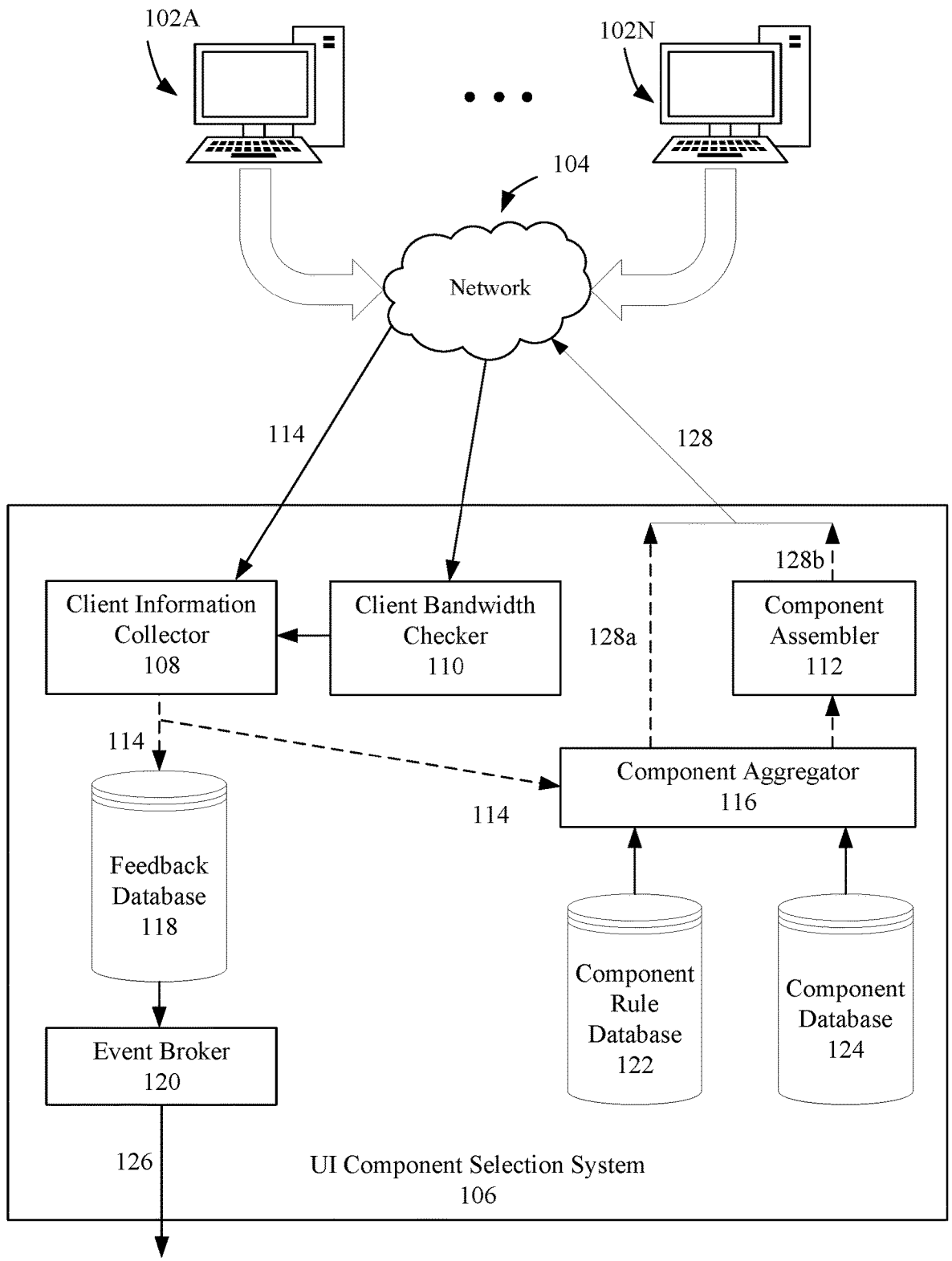
FIG. 1 shows a block diagram of a system for adaptively selecting user-interface components, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

II. Example Embodiments

Embodiments described herein enable distributed application platforms to adaptively render client application user-interface components in response to changes in operating conditions and priorities based on user role and context. As used herein, and as discussed in further detail below, a user-interface component is comprised of subparts that may include: a user-interface definition (e.g., the physical appearance and function of the component), associated user-interface services, and data to be displayed or accepted as input.

Prior to rendering the user-interface in the client application, it is necessary to assemble the user-interface components. Assembly comprises operations that fully construct the user-interface into renderable code (e.g. HTML code), including all needed data. In the example of HTML code, "render" or "rendering" means modifying the DOM of a webpage to include one or more user-interface components. It should be understood, however, that HTML, web pages, web browsers and the DOM related to these are but one means of rendering and displaying an application user-interface, and one of skill in the art will appreciate there are other means for such rendering and display in other embodiments. Embodiments will determine whether some or all of the user-interface components should be partly or wholly assembled locally by the system, or remotely by the client. As discussed in further detail below, embodiments of a user-interface component selection system in a distributed application platform may determine the minimal viable user-interface rendering for a particular client or clients.

For example, FIG. 1 shows a block diagram of a system 100 for selecting, assembling and transmitting user-interface components to an application running on a user device, for rendering and display by that device. System 100 includes a plurality of user devices 102A-102N, a network 104, and user-interface component selection system 106. User-interface component selection system 106 includes a number of components, including: client information collector 108, client bandwidth checker 110, component assembler 116, feedback database 118, component aggregator 116, event broker 120, component rule database 122, and component database 124.

User devices 102A-102N include the computing devices of users (e.g., individual users, family users, enterprise users, governmental users, etc.) that access user-interface component selection system 106 via network 104. Although depicted as a desktop computer, user devices 102A-102N may include other types of computing devices suitable for connecting with user-interface component selection system 106 via network 104. User devices 102A-102N may each be any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone, a wearable computing device, or other type of mobile device, or a stationary computing device such as a desktop computer or PC (personal computer), or a server. Note that the variable "N" is appended to reference numerals for illustrated components to indicate that the number of such components is variable, with any value of 2 and greater. Note that for each distinct component/reference numeral, the variable "N" has a corresponding value, which may be different for the value of "N" for other components/reference numerals. The value of "N" for any particular component/reference numeral may be less than 10, in the 10s, in the hundreds, in the thousands, or even greater, depending on the particular implementation.

Network 104 may comprise one or more networks such as local area networks (LANs), wide area networks (WANs), enterprise networks, the Internet, etc., and may include one or more of wired and/or wireless portions. What follows immediately below is a high-level description of the operation of the components of user-interface component selection system 106, and is intended to describe the basic functions of each of the components. Afterward, a more detailed description, including more detailed examples, shall be provided in conjunction with the flowcharts depicted in FIGS. 4 through 9.

User-interface component selection system 106 includes client information collector 108, and client bandwidth checker 110. Client information collector 108 receives client information 114 directly from each connected user device 102A-102N. In embodiments, client information 114 may comprise various types of information regarding a client. For example, and as will be discussed in more detail below, client information 114 may include the client's geo-location, the user role, the user context, application feature, and application and/or user-interface usage history including information regarding rendering of user-interface components. Client information collector 108 may also receive other client information indirectly from client bandwidth checker 110. Client bandwidth checker 110 is configured to determine the available bandwidth between user-interface component selection system 106 and each user device 102A-102N, and pass the bandwidth information along to client information collector 108 where it may thereafter be treated as part of client information 114 for each client, in an embodiment.

In an embodiment, user-interface selection system 106 uses client information in the following general manner First, client information collector 108 may be configured to provide client information 114 to either feedback database 118, component aggregator 116, or both, depending on the particular embodiment. In an embodiment, feedback database 118 may store client information 114 for later use as will be discussed in more detail below.

Discussion now turns to component aggregator 116. Component aggregator 116 may be configured to receive client information 114 from client information collector 108, and to determine a set of applicable rules from among those stored in component rule database 122. The set of component rules may dictate, for example, the particular combination of user-interface components to be rendered by the application executing on the client device, given the constraints defined by client information 114. After determining the user-interface components to be rendered, component aggregator 116 retrieves the appropriate user-interface components from component database 124, in an embodiment. Before final rendering and display of the application user-interface can be accomplished, however, the set of user-interface components retrieved from component database 124 must be assembled.

Prior to the user-interface components being rendered by the application, however, the user-interface components must be assembled. At a high level, and as will be discussed in greater detail below, assembly of a user-interface component requires retrieval of any needed data to be displayed in the final rendering, and construction of any needed rendering code. In an example embodiment, rendering code may comprise HTML code for rendering by a web browser. In an embodiment, component aggregator 116 may be configured to determine whether the user-interface components should be assembled locally via component assembler 112, or remotely by components included in a client device 102A-102N. Whether user-interface components are assembled locally or remotely, UI data 128 is transmitted by user-interface component selection system 106 to the client device. In the case of local assembly by component assembler 112, UI data 128 is comprised of assembled UI data 128b. In an embodiment, assembled UI data 128b may comprise, for example, HTML code that includes all underlying data required by the application, and is ready for immediate rendering by, for example, a web browser running on the client device. In the case of remote assembly, however, UI data 128 may be comprised of a user-interface component template along with instructions for how the client may retrieve data, as represented by unassembled UI data 128a.

After receipt of UI data 128, the client application executing on client device 102A-102N is responsible for rendering and displaying the user-interface. In an embodiment, and where UI data 128 comprises a user-interface component that has already been assembled, such rendering may be done immediately. On the other hand, if local assembly is required, embodiments of client device 102A-102N must retrieve needed data, and use the template to locally generate rendering code, such as, for example, HTML code for rendering in a web browser. In embodiments, client device 102A-102N may retrieve needed data via helper code included in the user-interface components retrieved from component database 124, and included in UI data 128 transmitted to the client.

In an embodiment, user-interface component selection system 106 may be implemented by a web site, web server, web service, and/or other transaction handling application. Note that although depicted as a monolithic component, user-interface component selection system 106 may be embodied in any number of computing devices such as servers, and may include any type and number of other resources, including resources that facilitate communications with and between the computing, user devices 102A-102N and any other necessary components internal or external to user-interface component selection system 106.

In embodiments, servers implementing user-interface component selection system 106 may be organized in any manner, including being grouped in server racks (e.g., 8-40 servers per rack, referred to as nodes or "blade servers"), server clusters (e.g., 2-64 servers, 4-8 racks, etc.), or datacenters (e.g., thousands of servers, hundreds of racks, dozens of clusters, etc.). In an embodiment, the servers of user-interface component selection system 106 may be co-located (e.g., housed in one or more nearby buildings with associated components such as backup power supplies, redundant data communications, environmental controls, etc.) to form a datacenter, or may be arranged in other manners. Accordingly, in an embodiment, user-interface component selection system 106 may comprise a datacenter in a distributed collection of datacenters.

Likewise, although user-interface component selection system 106 is depicted as having separate databases shown as feedback database 118, component rule database 122 and component database 124, it will be apparent to persons skilled in the art that some or all of the data, and some or all of the provided database operations may be incorporated into a single database. Likewise, it will be apparent to persons skilled in the art that some of the described operations of user-interface component selection system 106 may be performed in one or more databases. For example, some of the described operations of user-interface component selection system 106 may be incorporated into a stored procedure of an SQL (structured query language) database, in an embodiment.

Embodiments of user-interface component selection system 106 may also include event broker 120 of FIG. 1 particularly where user-interface component selection system 106 is implemented on, for example, server racks, server clusters or a distributed collection of datacenters. In embodiments, event broker 120 may be configured to permit client information 114 to be propagated from, for example, feedback database 118 to other servers in the cluster. As discussed in part above, and in more detail below, client information received from clients forms the basis for selecting component rules that dictate the selection, assembling and eventual rendering and display of user-interface components. Ordinarily, changes to such rendering and display require changes in operating conditions as reflected in additional client information provided to embodiments of user-interface component selection system 106. From time to time, however, events may require immediate enforcement of certain component rules. For example, a particular server cluster or data center may be experiencing bandwidth or other connectivity issues, and rather than fail to provide service to some clients, it would be preferable to degrade the user-interface experience of all users connected to that cluster. In such an instance, event broker 120 as shown in FIG. 1 may be configured to communicate such requirements to one or more of the other servers in the cluster.

Likewise, certain client devices may share operating characteristics with other such devices. In those instances, embodiments may automatically provide a certain level of service to a newly connecting client based on what the system has learned from other, similar clients based on the respective client information provided by each. For example, suppose client device 102A of FIG. 1 connects to user-interface component selection system 106, and due to limited bandwidth between the client device 102A and system 106, a minimal user-interface rendering is provided. Further suppose another client, for example client device 102B, subsequently connects to user-interface component selection system 106 from the same geolocation as client device 102A. In that instance, embodiments of user-interface component selection system 106 may automatically provide the same minimal user-interface rendering to client device 102B by virtue of what is likely to be a degraded connection for that client. In order to do so, however, each and every server of the server cluster must know to provide a similar minimal rendering to similarly situated client devices, since it generally not known in advance which server of the server cluster the client device will use to connect. In embodiments, event broker 120 may be configured to communicate such information regarding the state of one or more clients or client clusters to other servers in the server cluster.

Figure 3:
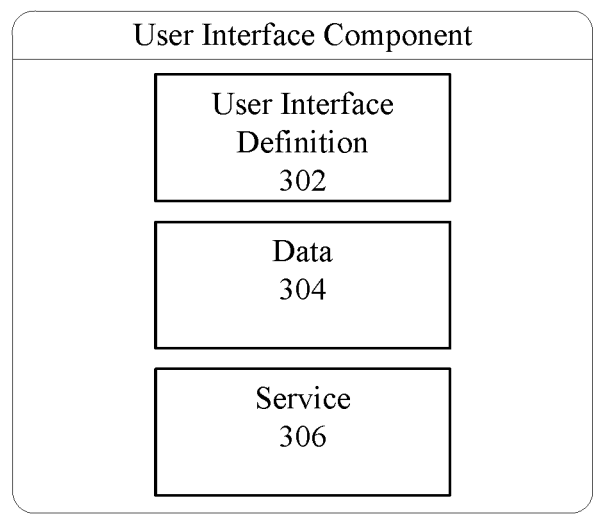
FIG. 3 shows an example user-interface component, according to an example embodiment.

In the context of the present disclosure, embodiments of user-interface components may be best understood in relation to FIG. 3. FIG. 3 depicts an example user-interface component 300, according to an example embodiment. User-interface component 300 includes user-interface definition 302, service 304, and data 306. In an embodiment, user-interface definition 302 defines the appearance and function of the rendered user-interface component as it appears in the application executing on the client device. In an example embodiment, user-interface definition 302 may include the size and shape of a particular user-interface region of the display, and may also include data input fields, data output fields and other graphical control elements such as radio buttons, check boxes, scroll bars, windows, panels, tabs and other types of user-interface elements as will be understood by one skilled in the art.

In an embodiment, data 304 of user-interface component 300 defines data to be displayed in data output fields, or other graphical control elements of the rendered user-interface component. For example, supposing that the distributed application platform is supporting a supply chain application, data 304 of the rendered user-interface component may require information pertaining to various supply chain suppliers, or the like. In other embodiments, data 304 may require data input to the user-interface by the user of the application executing on the user device. In embodiments, data 304 is not included in user-interface component 300, but instead defines the data and related metadata that must be retrieved from or sent to an external data repository such as, for example, a database.

In an example embodiment, service 306 comprises helper code that may be executed by either the local system, or by the client application. When executed, service 306 may provide, for example, data retrieval or storage functions. In embodiments, service 306 may be configured to retrieve data 304 from a database, or collection of databases or other data sources. In other embodiments, service 306 may likewise be configured to store data 304 accepted by the application running on client device to a database or other data sink.

Figure 2:
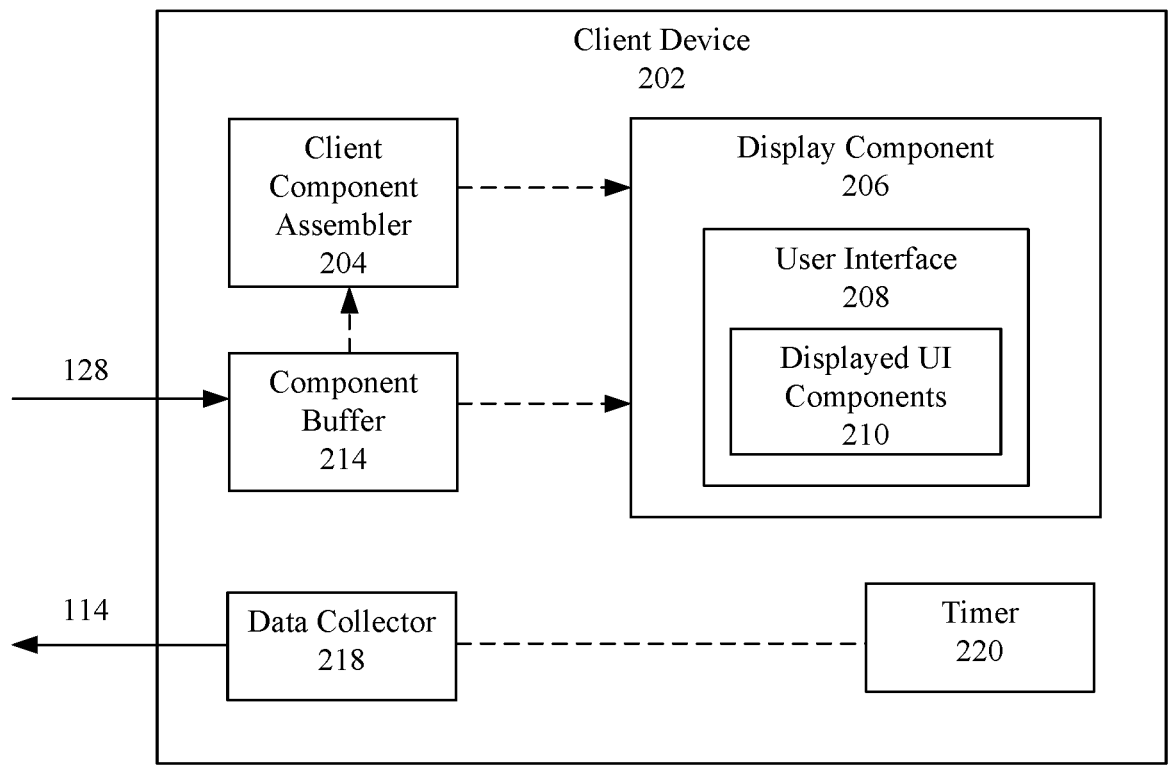
FIG. 2 shows a block diagram of a client device equipped to accept selected user-interface components for rendering and display, according to an example embodiment.

FIG. 2 shows a block diagram 200 of a client device 202 equipped to accept selected user-interface components for rendering and display, according to an embodiment. The following description of client device 202 is intended to be a high-level overview of the operations of each component, and more detailed examples will follow below in the discussion of flowcharts 400 through 900. Client device 202 includes client component assembler 204, display component 206, component buffer 214, data collector 218, and timer 220. In embodiments, and as discussed in greater detail below, data collector 218 may be configured to gather client information 114 to send to, for example, user-interface component selection system 106. Some embodiments may also include timer 220 that may be configured to intermittently or periodically trigger data collector 218 to send any client information 114 that has been gathered since the last trigger.

Component buffer 214 may be configured to accept UI data 128 from user-interface component selection system 106, in an embodiment. Component buffer 214 may include one or more of any type of physical storage mechanism including, a memory device such as a DRAM (dynamic random access memory) device, SRAM (static random access memory) device and/or any other suitable type of physical storage device suitable for storage and access by processing devices.

In the case where component aggregator 116 of user-interface component selection system 106 determined that user-interface component assembly should occur local to user-interface component selection system 106, UI data 128 may comprise information ready for immediate rendering, such as HTML code in some embodiments. In such an instance, component buffer 214 may directly render UI data 128 to display component 206 where they will appear in user-interface 208 as displayed UI components 210.

On the other hand, where component aggregator 116 of user-interface component selection system 106 determined that user-interface component assembly should occur at the client system, component buffer 214 will instead pass UI data 128 to client component assembler 204. In embodiments, client component assembler 204 may be configured to assemble the user-interface components into renderable code in a manner similar to that discussed above in relation to user-interface component assembly performed by user-interface component selection system 106. In particular, client component assembler 204 may be configured to accept the templates and data retrieval instructions and/or code incorporated into respective user-interface component services to retrieve any needed data, and transform the templates and data into renderable code, such as, for example HTML code, in an embodiment. After client component assembler 204 completes user-interface component assembly, resulting code may be passed to display component 206, where displayed UI components 210 may rendered in user-interface 208.

In embodiments, user-interface component assembly by, for example, client device 202 may proceed concurrently in the background with other client processes or threads. For example, embodiments of client component assembler 204 may be configured to assemble user-interface components while other components are being rendered and displayed, or more while data collector 218 is collecting and/or transmitting client information 114 to the user-interface selection system 106.

In some embodiments, user-interface component assembly performed by client component assembler 204 may occur on demand or on an otherwise deferred basis. For example, some user-interface components may not always be visible amongst displayed UI components 210 as shown in user-interface 208. That is, user-interface components not currently visible among the displayed UI components 210 need not be rendered until the user-interface components become visible (e.g. due to scrolling, or opening or closing other user-interface components currently displayed). Similarly, even displayed UI components 210 need not be fully rendered immediately. Instead, embodiments may insert a placeholder graphic until such time the user interacts with the graphic through, for example, mouse pointer hovering, mouse clicks, screen touches, or other types of input. Other structural and operational embodiments of user-interface component selection system 106 will be apparent to persons skilled in the relevant art based on the following discussion of example embodiments of different methods for operating user-interface component selection system 106. Such discussion begins with flowchart 400 of FIG. 4.

Figure 4:
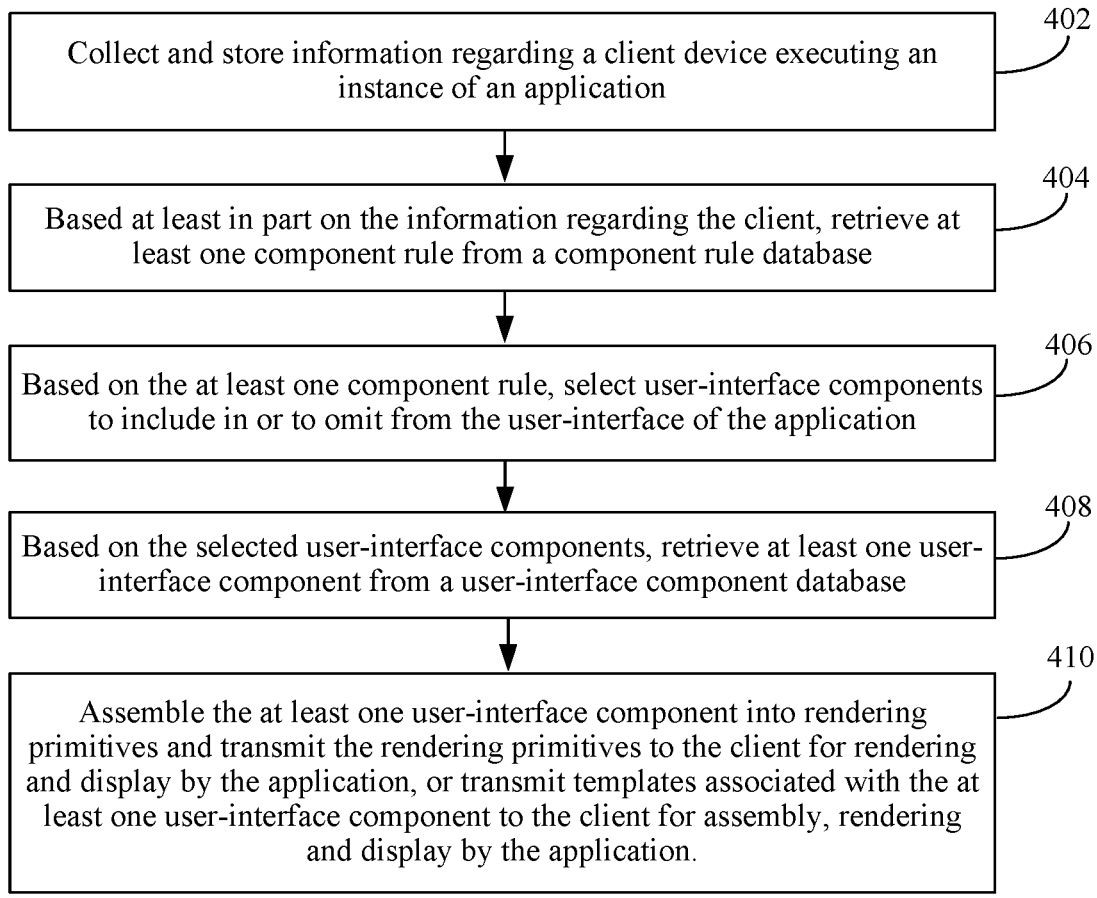
FIG. 4 shows a flowchart of an example method for selecting user-interface components for assembling and rendering, according to an example embodiment.

Flowchart 400 begins at step 402. In step 402 of flowchart 400, embodiments of user-interface selection system 106 may collect and store information regarding the client device executing instance of an application, as depicted in FIG. 4. Information regarding the client device may comprise client information 114 as discussed in conjunction with FIGS. 1 and 2 above. In particular, in embodiments, such information may comprise the available network bandwidth of the client device, client device geolocation, the user role (wherein the user is the user of the application running on client device), a user context, and required application features of which a particular user-interface component as a part.

In embodiments, the available network bandwidth of, for example, client device 202, may be determined in conjunction with client bandwidth checker 110 of FIG. 1, as discussed above. Various means of determining the available bandwidth between a client and server are known in the art. Likewise, geolocation of a connected client device may be determined in embodiments by, for example, the IP address of client device. It may not always be possible to determine the geolocation of the client by device IP address, and other known methods for determining the geolocation of the connected device may be used instead.

The user role of a user of the application executing on the client device is a means for identifying the particular rights and privileges that should accrue to the user. For example, where the distributed application executing on the client and server is used for process approvals and the like, senior workers and other management personnel may be given the user role that permits them to approve or reject submitted process approvals. On the other hand, junior workers that are seeking process approval may be placed into a role that permits them only to submit process approvals, and neither prove nor reject such proofs. User roles may also serve to provide users with a particular role with an enhanced or expedited experience based on high priority actions likely to be taken by the user is in such roles. For example, executives with signature authority incorporation may be expected to promptly execute legal documents on behalf of the corporation, and therefore be given priority access to the distributed application platform and the applications running thereon.

User context reflects the historical operating norms for a given user. For example, embodiments of user-interface component selection system 106 and applications relying on the system, may learn through client information 114 that is received by user-interface component selection system 106 and stored in feedback database 118 that a particular user never connects to the system from the corporate network on Sundays, but instead some other IP address, and geolocation on a consistent basis. A user's ordinary course of use of the application platform constitutes the user context. User context may be important in the instance where the current use of the application platform being made is outside the ordinary user context associated with the user. Returning to the example immediately above, supposing that on Sunday the same user connects from the corporate network, such connection would not be consistent with the historical user context, and a different user-interface rendering may be desirable for that user in that context. In this example, because the user is on corporate network, it can be surmised that network bandwidth will not be an issue, and any bandwidth related constraints previously imposed on the normal user context may be ignored to enhance the user experience during this particular session, in embodiments.

In embodiments, client information 114 as shown in FIG. 1 may also include information regarding the application feature in use by the user at any given point in time. Not all application features ought to be provided with the same rendering priority, and including information about the application features in use by the client device allows embodiments to adjust for these differences and, elect to defer rendering of low priority application user-interface features.

The above discussed factors, when combined, enable embodiments to flexibly and adaptively select user-interface components to be rendered through component rules selected based in part on the factors. In step 404 of flowchart 400, embodiments may retrieve at least one component rule from a component rule database based at least in part on information regarding a client gathered at step 402. As discussed above, one or more such rules dictate the user-interface components to be selected for rendering. In particular, based on the at least one component rule retrieved, for example, from the component rule database at step 404, embodiments may select user-interface components to include in, or to omit from, the user-interface of the application at step 406 of flowchart 400. Note, selection of user-interface components should be understood to be both inclusive and exclusive. That is selection of user-interface components may include selecting and designating user-interface components that should not be rendered in the user-interface of the application.

Applicable rules may affect the selection of user-interface components in a number of different ways, and rules may be flexibly crafted to generate the desired behaviors and component renderings at the client. For example, suppose that for a particular application feature in use (e.g. executing a corporate contract on an acquisition worth millions of dollars), the user role of the user making use of that feature (e.g. a company vice president or other high ranking executive) requires high priority access to the feature, and the user's device unfortunately does not have good bandwidth to the user-interface component selection system 106. In such an instance, and as will be discussed in more detail below, it may be desirable that only the bare minimum of user-interface components are selected for rendering on the client device, and that the selected user-interface components are designated to be assembled by the client device rather than the system (since remote assembly may be less bandwidth intensive). Likewise, the geolocation of the client may dictate a restriction to some or all of the desired data, and be disallowed. In other circumstances, deviations from the ordinary user context may be important, and different user-interface component rules may be created and enforced depending on such contextual changes. Similarly, a given user historically may have only used a single user-interface component of those made available. In that situation, it may be desirable to have a rule that results in the client deferring component assembly and rendering until that last instant (e.g. deferred assembly). As noted above, the selected component rules shall dictate the user-interface components to be rendered as discussed in relation to stop 408.

Flowchart 400 continues at step 408. In step 408 of flowchart 400, embodiments may retrieve at least one user-interface component from a user-interface component database based on the user-interface component selected at step 406. Such components are those to eventually be made available for rendering at the client device (whether immediately or on a deferred basis). Prior to rendering the user-interface component, however, retrieved user-interface components must be assembled at step 410 of flowchart 400.

At step 410, embodiments of user-interface component selection system 106 may assemble the at least one user-interface component locally at the system. For example, and as discussed above, component assembler 112 may assemble the user-interface components, and then transmit complete and immediately renderable primitives to the client. User-interface components are assembled by retrieving the needed data, and along with the user-interface definition of the user-interface component, creating fully integrated, renderable data. Where the user-interface on the client device is HTML based, this means constructing HTML code including the data retrieved using, for example, service component 306 of FIG. 3, and laying the HTML code over the DOM of the browser for rendering. When rendering locally at, for example, component assembler 112, only fully formed HTML is sent to the client device, and is generally more bandwidth intensive.

Alternatively, user-interface component selection system 106 may instead transmit incomplete primitives to the client for remote assembly, rendering and display by the client. For example, component buffer 214 may be configured to detect whether UI data 128 coming from the user-interface component selection system 106 is fully integrated and renderable code including all data, or instead comprises user-interface templates, along with applicable user-interface service components such as, for example, service component 306, as shown in FIG. 3. If the latter, client component assembler 204 of client device 202 shall assemble the user-interface components retrieving any needed data with service component 306, and using the templates to create, renderable code. Embodiments may designate user-interface components for local or remote assembly for a variety of reasons including based on at least one component rule as discussed in flowchart 500 of FIG. 5.

Figure 5:
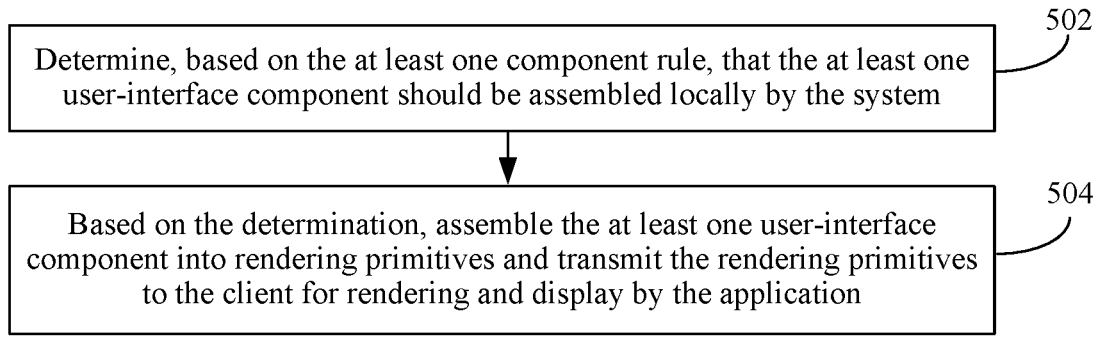
FIG. 5 shows a flowchart of an example method of user-interface component assembling performed by a local system, according to an example embodiment.

Flowchart 500 of FIG. 5 begins at step 502. In step 502 of flowchart 500, embodiments may use component rules (e.g. the at least one component rule retrieved at step 404 of flowchart 400) to determine that at least one user-interface component should be assembled locally by user-interface selection system 106. In embodiments, it may be preferable to assemble user-interface components locally, particularly where there is ample bandwidth between user-interface component selection system 106, and client device 202, and where client device 202 may have limited storage and or computational resources.

Continuing to step 504, based on the determination made step 502, embodiments assemble the at least one user-interface component into complete and immediately renderable primitives and/or code such as HTML code, and transmit same to the client for rendering and display by the application. Alternatively, embodiments of user-interface selection system 106 may be configured to determine that the at least one user-interface component should be assembled remotely by the application as discussed below regarding flowchart 600 of FIG. 6.

FIG. 6 depicts a flowchart 600, which begins at step 602. In step 602 of flowchart 600, embodiments of user-interface component selection system 106 may determine that the at least one user-interface component should be assembled remotely by, for example, client device 202. At step 602, such determination may be made based at least in part on, for example, the at least one component rule, retrieved at, for example, step 404 of flowchart 400. It may be desirable in some embodiments to designate certain user-interface component or remote assembly, particularly where such user-interface components are designated for deferred rendering whereby the user-interface components may never need to be assembled or rendered at all. Also, remote assembly of user-interface components by, for example, client device 202 is less bandwidth intensive, and thus may be desirable under a limited bandwidth circumstances.

Continuing to step 604, and based on the determination made step 602, embodiments transmit templates and data instructions and/or code to, for example, client device 202. Embodiments may use the received templates and code (e.g. code associated with service component 306 as shown in FIG. 3) to retrieve any needed data and transform the templates to renderable code such as, for example, HTML code.

The foregoing description outlines a process by which embodiments use client information to determine whether and how to render user-interface components in an application executing on a user device. In other embodiments, however, additional client information may be collected to permit adaptive changes to the user-interface displayed on user device. Flowchart 700 of FIG. 7 describes a method for detecting changed operating conditions at the client, causing new user-interface components to be selected, assembled, rendered and displayed on a user device in response thereto. Flowchart 700 begins at step 702. In step 702 of flowchart 700, additional client information is intermittently collected from the client, and stored. Such additional client information may be gathered by, for example, client information collector 108 of user-interface component selection system 106 as depicted in FIG. 1. Client information collector 108 may gather the additional client information in a number of ways. For example, client information collector 108 may collect information from each client on a pull basis (e.g. polling), or may also accept additional client information pushed from each client. In an embodiment, a client, such as client device 202, may collect and store client information locally, and intermittently push such information to user-interface component selection system 106 in response to a trigger from timer 220.

Flowchart 700 continues at step 704, where at least one additional component rule may be retrieved from component rule database based at least in part on the additional information received by, for example, user-interface component selection system 106, in an embodiment. As can be appreciated from the above discussion of component rules, it will be apparent how changed operating conditions may make it desirable to modify user-interface rendering in response to such changed conditions. For example, bandwidth between, for example, client device 202 and user-interface component selection system 106 may degrade. Under such circumstances, it may be desirable for embodiments to reduce the number of user-interface components to render, or to switch to remote assembling of the user-interface components, rather than local system assembling. Additionally, the user may switch to a different application that has different operating needs. Also, the user's role, as reflected in access and modification privileges, may dictate a different experience in a new application. For example, under the new operating conditions imposed by starting a different application, the user may have read-only access to certain sections.

Flowchart 800 of FIG. 8 depicts a method for embodiments of user-interface component selection system 106 to identify clients having similar operating characteristics and assign such clients to a client cluster. A client cluster is a group of clients identified as having similar operating characteristics as defined by client information provided by each to, for example, user-interface component selection system 106. Such client information may comprise, for example, any of the types of client information 114 identified above. Note, it is not necessary for client operating conditions for the various clients to be identical in order to be designated as members of a particular client cluster. Instead, it suffices if the conditions have sufficient measures of similarity, and as will be understood by one skill in the relevant art(s).

In an embodiment, flowchart 900 of FIG. 9 shows a method for using client cluster membership information. Flowchart 900 begins at step 902. In step 902, user-interface component selection system 106 may detect whether a newly connecting client has operating conditions sufficiently similar to the clients included in an existing client cluster. In response to detecting such, embodiments may designate the new client for inclusion in the client cluster, and select at least one additional component rule from the component database wherein the additional component rule dictates selection of at least one user-interface component different than others selected based only on, for example, client information 114 provided to user-interface component selection system 106. Performance of such method steps enables embodiments to proactively select more appropriate user-interface components for render based on the known operating conditions of the client cluster members. This approach saves embodiments of user-interface selection system 106 from having to learn the operating conditions of the client prior to attempting a more optimal rendering scheme.

Note that foregoing general description of the operation of user-interface component selection system 106 is provided for example, and embodiments of user-interface component selection system 106 may operate in manners different than described above. Furthermore, not all steps of flowcharts 400-900 need to be performed in all embodiments. Furthermore, the steps of flowcharts 400-900 may be performed in orders different than shown in some embodiments.

III. Example Computer System Implementation

User device(s) 102A-102N, user-interface component selection system 106, client information collector 108, client bandwidth checker 110, component assembler 116, component aggregator 116, event broker 120, client device 202, client component assembler 204, component buffer 214, data collector 218, timer 220, and/or flowcharts 400 through 900 may be implemented in hardware, or hardware combined with software and/or firmware. For example, user-interface component selection system 106, client information collector 108, client bandwidth checker 110, component assembler 116, component aggregator 116, event broker 120, client device 202, client component assembler 204, component buffer 214, data collector 218, timer 220, and/or flowcharts 400 through 900 may be implemented as computer program code/instructions configured to be executed in one or more processors and stored in a computer readable storage medium. Alternatively, user-interface component selection system 106, client information collector 108, client bandwidth checker 110, component assembler 116, component aggregator 116, event broker 120, client device 202, client component assembler 204, component buffer 214, data collector 218, timer 220, and/or flowcharts 400 through 900 may be implemented as hardware logic/electrical circuitry.

For instance, in an embodiment, one or more, in any combination, of user-interface component selection system 106, client information collector 108, client bandwidth checker 110, component assembler 116, component aggregator 116, event broker 120, client device 202, client component assembler 204, component buffer 214, data collector 218, timer 220, and/or flowcharts 400 through 900 may be implemented together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 10:
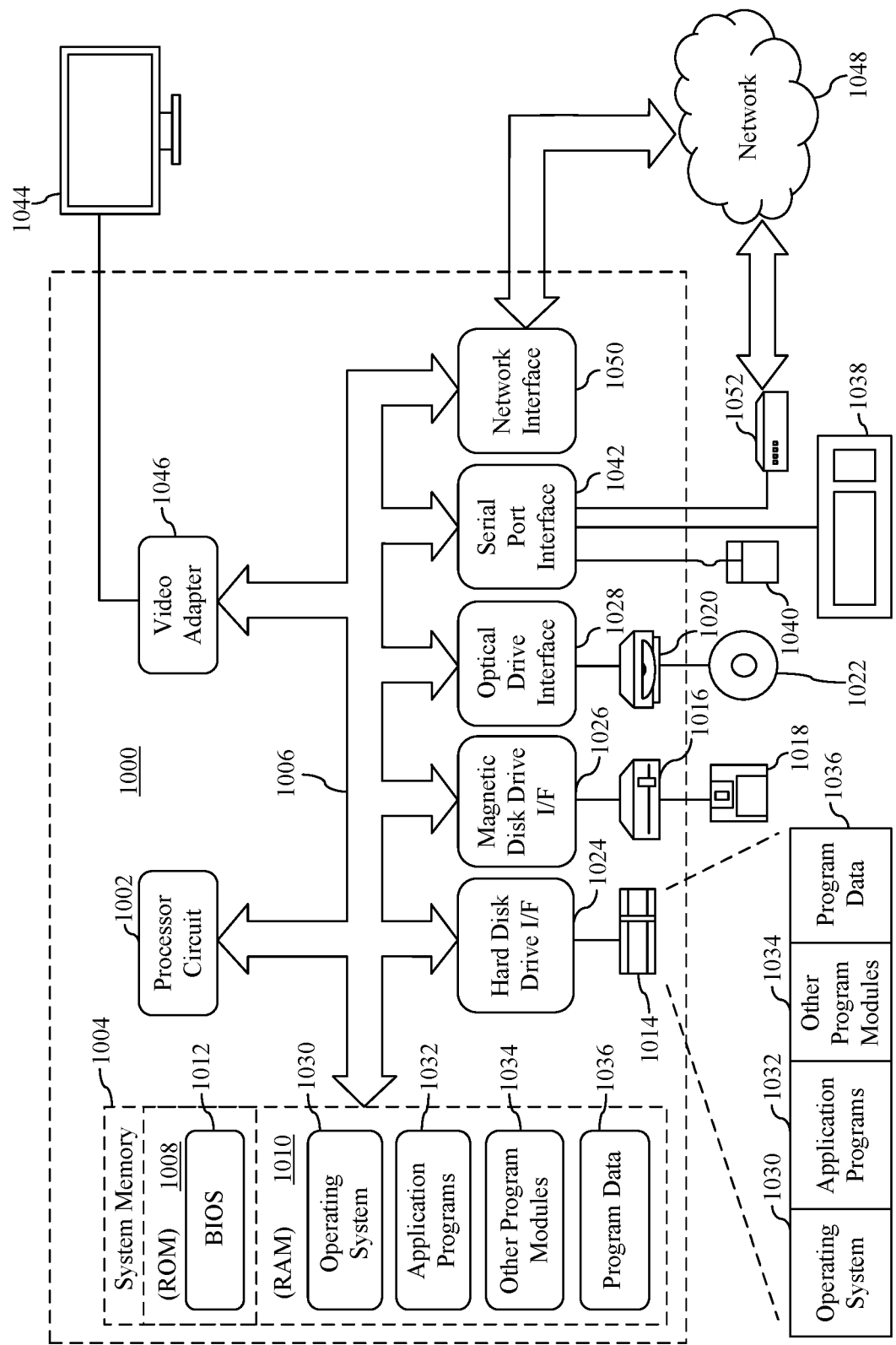
FIG. 10 is a block diagram of an example processor-based computer system that may be used to implement various embodiments.

FIG. 10 depicts an exemplary implementation of a computing device 1000 in which embodiments may be implemented. For example, portions of user-interface component selection system 106, user device(s) 102A-102N, or client device 202 may each be implemented in one or more computing devices similar to computing device 1000 in stationary or mobile computer embodiments, including one or more features of computing device 1000 and/or alternative features. The description of computing device 1000 provided herein is provided for purposes of illustration, and is not intended to be limiting. Embodiments may be implemented in further types of computer systems, as would be known to persons skilled in the relevant art(s).

As shown in FIG. 10, computing device 1000 includes one or more processors, referred to as processor circuit 1002, a system memory 1004, and a bus 1006 that couples various system components including system memory 1004 to processor circuit 1002. Processor circuit 1002 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1002 may execute program code stored in a computer readable medium, such as program code of operating system 1030, application programs 1032, other programs 1034, etc. Bus 1006 represents one or more of any of several types of bus structures, including a memory bus or memory controller, a peripheral bus, an accelerated graphics port, and a processor or local bus using any of a variety of bus architectures. System memory 1004 includes read only memory (ROM) 1008 and random access memory (RAM) 1010. A basic input/output system 1012 (BIOS) is stored in ROM 1008.

Computing device 1000 also has one or more of the following drives: a hard disk drive 1014 for reading from and writing to a hard disk, a magnetic disk drive 1016 for reading from or writing to a removable magnetic disk 1018, and an optical disk drive 1020 for reading from or writing to a removable optical disk 1022 such as a CD ROM, DVD ROM, or other optical media. Hard disk drive 1014, magnetic disk drive 1016, and optical disk drive 1020 are connected to bus 1006 by a hard disk drive interface 1024, a magnetic disk drive interface 1026, and an optical drive interface 1028, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1030, one or more application programs 1032, other programs 1034, and program data 1036. Application programs 1032 or other programs 1034 may include, for example, computer program logic (e.g., computer program code or instructions) for implementing user-interface component selection system 106, client information collector 108, client bandwidth checker 110, component assembler 116, component aggregator 116, event broker 120, client device 202, client component assembler 204, component buffer 214, data collector 218, timer 220, and/or flowcharts 400 through 900 (including any suitable step of flowcharts 400 through 900), and/or further embodiments described herein.

A user may enter commands and information into the computing device 1000 through input devices such as keyboard 1038 and pointing device 1040. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1002 through a serial port interface 1042 that is coupled to bus 1006, but may be connected by other interfaces, such as a parallel port, game port, or a universal serial bus (USB).

A display screen 1044 is also connected to bus 1006 via an interface, such as a video adapter 1046. Display screen 1044 may be external to, or incorporated in computing device 1000. Display screen 1044 may display information, as well as being a user-interface for receiving user commands and/or other information (e.g., by touch, finger gestures, virtual keyboard, etc.). In addition to display screen 1044, computing device 1000 may include other peripheral output devices (not shown) such as speakers and printers.

Computing device 1000 is connected to a network 1048 (e.g., the Internet) through an adaptor or network interface 1050, a modem 1052, or other means for establishing communications over the network. Modem 1052, which may be internal or external, may be connected to bus 1006 via serial port interface 1042, as shown in FIG. 10, or may be connected to bus 1006 using another interface type, including a parallel interface.

As used herein, the terms "computer program medium," "computer-readable medium," and "computer-readable storage medium" are used to refer to physical hardware media such as the hard disk associated with hard disk drive 1014, removable magnetic disk 1018, removable optical disk 1022, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1032 and other programs 1034) may be stored on the hard disk, magnetic disk, optical disk, ROM, RAM, or other hardware storage medium. Such computer programs may also be received via network interface 1050, serial port interface 1042, or any other interface type. Such computer programs, when executed or loaded by an application, enable computing device 1000 to implement features of embodiments described herein. Accordingly, such computer programs represent controllers of the computing device 1000.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Example Embodiments

An adaptive user-interface component selection system is described herein. The system comprises: a feedback database for storing information regarding a client device upon which an instance of the application is executing; a user-interface component database containing user-interface components; a component rule database containing user-interface component selection rules; one or more processors; and one or more memory devices accessible to the one or more processors, the one or more memory devices storing program code for execution by the one or more processors, the program code including: a client information collector configured to collect and store the information regarding a client device in the feedback database, and further configured to provide at least some of the information regarding a client device to a component aggregator, the component aggregator configured to: based at least in part on the information regarding a client device, retrieve at least one component rule from the component rule database; based on the at least one component rule, select user-interface components to include in or to omit from the user-interface of the instance of the application, and based on the selected user-interface components, retrieve at least one user-interface component from the user-interface component database; based on the at least one component rule, determine whether the at least one user-interface component should be assembled locally by the system, or assembled remotely by the client device; in response to determining the at least one user-interface component should be assembled locally, assemble the at least one user-interface component into rendering primitives, and transmit the rendering primitives to the client device for rendering and display by the executing application; and in response to determining the at least one user-interface component should be assembled remotely by the client device, transmit templates associated with the at least one user-interface component to the client device for assembly, rendering and display on the client device.

In an embodiment of the foregoing system, information regarding the client device comprises: client network bandwidth; client geo-location; client user role; client user context; and client application feature.

In one embodiment of the foregoing system, the component aggregator is further configured to: intermittently accept additional information regarding a client from the client information collector, the additional information regarding a client reflecting changed operating conditions of the client; and retrieve at least one additional component rule from the component rule database based at least in part on the additional information regarding a client, wherein the at least one additional component rule causes greater or fewer user-interface components to be rendered and displayed by the application executing on the client device in response to the changed operating conditions.

In an embodiment of the foregoing system, information regarding the client device further comprises information regarding user-interface components with which the user of the application executing on the client device has interacted.

In one embodiment of the foregoing system, the client information collector is further configured to identify at least one client cluster comprising a plurality of client devices each having substantially similar operating conditions as reflected in the information regarding a client device provided by each.

In an embodiment of the foregoing system, the component aggregator is further configured to detect whether the client device is a member of an existing client cluster and, in response to the client being a member of an existing client cluster, selecting at least one additional component rule from the component rule database, the at least one additional component rule dictating selection of an additional user-interface component different from the at least one user-interface component.

A computer implemented method for adaptively selecting a user-interface component for rendering and displayed by an instance of an application executing on a client is provided herein. The method includes: collecting and storing information regarding the client; based at least in part on the information regarding the client, retrieving at least one component rule from a component rule database; based on the at least one component rule, selecting user-interface components to include in or to omit from the user-interface of the application, and based on the selected user-interface components, retrieving at least one user-interface component from a user-interface component database; and assembling the at least one user-interface component into rendering primitives and transmitting the rendering primitives to the client for rendering and display by the application, or transmitting templates associated with the at least one user-interface component to the client for assembly, rendering and display by the application.

In an embodiment of the foregoing method, information regarding the client comprises: client network bandwidth; client geo-location; client user role; client user context; and client application feature.

In another embodiment of the foregoing method, assembling the at least one user-interface component into rendering primitives and transmitting the rendering primitives to the client for rendering and display by the application is done in response to determining, based on the at least one component rule, that the at least one user-interface component should be assembled locally by the system.

In one embodiment of the foregoing method, transmitting templates associated with the at least one user-interface component to the client for assembly, rendering and display by the application is done in response to determining, based on the at least one component rule, that the at least one user-interface component should be assembled remotely by the application.

In an embodiment of the foregoing method, the computer implemented method further comprises: intermittently collecting and storing additional information regarding the client from the client, the additional information regarding the client reflecting changed operating conditions at the client; and retrieving at least one additional component rule from the component rule database based at least in part on the additional information regarding the client, wherein the at least one additional component rule causes greater or fewer user-interface components to be rendered and displayed by the client in response to the changed operating conditions.

In another embodiment of the foregoing method, information regarding the client further comprises information regarding user-interface components of the application executing on the client the user of the client has interacted with.

In one embodiment of the foregoing method, the computer implemented method further comprises: identifying at least one client cluster comprising a plurality of clients each having substantially similar operating conditions as reflected in the information regarding the client provided by each.

In an example embodiment of the foregoing method, the computer implemented method further comprises: detecting whether an additional client device is a member of the at least one client cluster and, in response to the client being a member of the at least one client cluster, selecting at least one additional component rule from the component rule database, the at least one additional component rule dictating selection of an additional user-interface component different from the at least one user-interface component.

A computer program product comprising a computer readable memory device having computer program logic recorded thereon that when executed by at least one processor of a computing device causes the at least one processor to perform operations is described herein. The operations include: collecting and storing information regarding a client device upon which an instance of an application is executing; based at least in part on the information regarding a client device, retrieving at least one component rule from a component rule database; selecting user-interface components to include in or to omit from the user-interface of the application, and based on the selected user-interface components, retrieving at least one user-interface component from a user-interface component database; and determining based on the at least one component rule whether the at least one user-interface component should be assembled locally by the system, or assembled remotely by the application executing on the client device; in response to determining the at least one user-interface component should be assembled locally, assembling the at least one user-interface component into rendering primitives, and transmitting the rendering primitives to the client device for rendering and display by the executing application; and in response to determining the at least one user-interface component should be assembled remotely by the client device, transmit templates associated with the at least one user-interface component to the client device for assembly, rendering and display on the client device.

In one embodiment of the foregoing computer program product, information regarding client device comprises: client network bandwidth; client geo-location; client user role; client user context; and client application feature.

In one embodiment of the foregoing computer program product, the operations further comprise: intermittently collecting and storing additional information regarding a client from the client, the additional information regarding a client reflecting changed operating conditions at the client; and retrieving at least one additional component rule from the component rule database based at least in part on the additional information regarding a client, wherein the at least one additional component rule causes greater or fewer user-interface components to be rendered and displayed by the client in response to the changed operating conditions.

In an embodiment of the foregoing computer program product, information regarding the client further comprises information regarding user-interface components of the application executing on the client the user of the client has interacted with.

In another embodiment of the foregoing computer program product, the operations further comprise: identifying at least one client cluster comprising a plurality of clients each having substantially similar operating conditions as reflected in the information regarding a client provided by each.

In one embodiment of the foregoing computer program product, the operations further comprise: detecting whether an additional client device is a member of the at least one client cluster and, in response to the client being a member of the at least one client cluster, selecting at least one additional component rule from the component rule database, the at least one additional component rule dictating selection of an additional user-interface component different from the at least one user-interface component.

V. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. An adaptive user-interface component selection system for an application, comprising:
   a feedback database for storing information regarding a client device upon which an instance of the application is executing;
   a user-interface component database containing user-interface components;
   a component rule database containing user-interface component selection rules;
   one or more processors; and
   one or more memory devices accessible to the one or more processors, the one or more memory devices storing program code for execution by the one or more processors, the program code including:
      a client information collector configured to collect and store the information regarding the client device in the feedback database, the information regarding the client device including information representative of at least client network bandwidth or client geo-location, and further configured to provide at least some of the information regarding the client device to a component aggregator, the component aggregator configured to:
         based at least in part on the information regarding the client device, retrieve at least one component rule from the component rule database;
         based on the at least one component rule, select user-interface components to include in or to omit from the user-interface of the instance of the application, and based on the selected user-interface components, retrieve a user-interface component from the user-interface component database;
         based on the at least one component rule, determine whether the retrieved user-interface component should be assembled locally by the system, or assembled remotely by the client device;
         in response to determining that the retrieved user-interface component should be assembled locally, assemble the retrieved user-interface component into a renderable primitive, and transmit the renderable primitive to the client device for rendering by the executing application; and
         in response to determining that the retrieved user-interface component should be assembled remotely by the client device, transmit a template associated with the retrieved user-interface component to the client device for assembly and rendering by the executing application on the client device, wherein assembly by the executing application comprises retrieving data after receiving the template and using the retrieved data to transform the template into the renderable primitive.

2. The adaptive user-interface component selection system of claim 1 wherein the information regarding the client device comprises one or more of:
   client user role;
   client user context; and
   client application feature.

3. The adaptive user-interface component selection system of claim 1 wherein the component aggregator is further configured to:
   intermittently accept additional information regarding the client from the client information collector, the additional information regarding the client reflecting changed operating conditions of the client; and
   retrieve at least one additional component rule from the component rule database based at least in part on the additional information regarding the client, wherein the at least one additional component rule causes greater or fewer user-interface components to be rendered by the application executing on the client device in response to the changed operating conditions.

4. The adaptive user-interface component selection system of claim 2 wherein the information regarding the client device further comprises information regarding user-interface components the user of the application executing on the client device has interacted with.

5. The adaptive user-interface component selection system of claim 1, wherein the client information collector is further configured to identify at least one client cluster comprising a plurality of client devices each having substantially similar operating conditions as reflected in the information regarding the client device provided by each.

6. The adaptive user-interface component selection system of claim 5, wherein the component aggregator is further configured to detect whether the client device is a member of an existing client cluster and, in response to the client being a member of an existing client cluster, selecting at least one additional component rule from the component rule database, the at least one additional component rule dictating selection of an additional user-interface component different from the retrieved user-interface component.

7. A computer-implemented method for adaptively selecting a user-interface component for rendering by an instance of an application executing on a client, comprising:
   collecting and storing information regarding the client, the information regarding the client being representative of at least client network bandwidth or client geo-location;
   based at least in part on the information regarding the client, retrieving at least one component rule from a component rule database;
   based on the at least one component rule, selecting user-interface components to include in or to omit from the user-interface of the application, and based on the selected user-interface components, retrieving a user-interface component from a user-interface component database; and
   based on the at least one component rule, assembling the retrieved user-interface component into a renderable primitive and transmitting the renderable primitive to the client for rendering by the application, or transmitting a template associated with the retrieved user-interface component to the client for assembly and rendering by the application, wherein assembly by the application comprises retrieving data after receiving the template and using the retrieved data to transform the template into the renderable primitive.

8. The computer-implemented method of claim 7, wherein the information regarding the client comprises one or more of:
   client user role;
   client user context; and
   client application feature.

9. The computer-implemented method of claim 8 wherein assembling the retrieved user-interface component into the renderable primitive and transmitting the renderable primitive to the client for rendering by the application is done in response to determining, based on the at least one component rule, that the retrieved user-interface component should be assembled locally by the system.

10. The computer-implemented method of claim 8 wherein transmitting the template associated with the retrieved user-interface component to the client for assembly and rendering by the application is done in response to determining, based on the at least one component rule, that the retrieved user-interface component should be assembled remotely by the application.

11. The computer-implemented method of claim 7 further comprising:
   intermittently collecting and storing additional information regarding the client from the client, the additional information regarding the client reflecting changed operating conditions at the client; and
   retrieving at least one additional component rule from the component rule database based at least in part on the additional information regarding the client, wherein the at least one additional component rule causes greater or fewer user-interface components to be rendered by the client in response to the changed operating conditions.

12. The computer-implemented method of claim 8 wherein information regarding the client further comprises information regarding user-interface components of the application executing on the client the user of the client has interacted with.

13. The computer-implemented method of claim 8 further comprising:
   identifying at least one client cluster comprising a plurality of clients each having substantially similar operating conditions as reflected in the information regarding the client provided by each.

14. The computer-implemented method of claim 13 further comprising:
   detecting whether an additional client device is a member of the at least one client cluster and, in response to the client being a member of the at least one client cluster, selecting at least one additional component rule from the component rule database, the at least one additional component rule dictating selection of an additional user-interface component different from the retrieved user-interface component.

15. A computer program product comprising a computer-readable memory device having computer program logic recorded thereon that when executed by at least one processor of a computing device causes the at least one processor to perform operations, the operations comprising:
   collecting and storing information regarding a client device upon which an instance of an application is executing, the information regarding the client device being representative of at least client device network bandwidth or client device geo-location;
   based at least in part on the information regarding the client device, retrieving at least one component rule from a component rule database;
   selecting user-interface components to include in or to omit from the user-interface of the application, and based on the selected user-interface components, retrieving a user-interface component from a user-interface component database; and
   determining based on the at least one component rule whether the retrieved user-interface component should be assembled locally by the system, or assembled remotely by the application executing on the client device;
   in response to determining the retrieved user-interface component should be assembled locally, assembling the retrieved user-interface component into a renderable primitive, and transmitting the renderable primitive to the client device for rendering by the executing application; and
   in response to determining the retrieved user-interface component should be assembled remotely by the client device, transmit a template associated with the retrieved user-interface component to the client device for assembly and rendering by the executing application on the client device, wherein assembly by the executing application comprises retrieving data after receiving the template and using the retrieved data to transform the template into the renderable primitive.

16. The computer program product of claim 15, wherein the information regarding the client device comprises one or more of:

client user role;
client user context; and
client application feature.

17. The computer program product of claim 16, the operations further comprising:

intermittently collecting and storing additional information regarding the client from the client, the additional information regarding the client reflecting changed operating conditions at the client; and retrieving at least one additional component rule from the component rule database based at least in part on the additional information regarding the client, wherein the at least one additional component rule causes greater or fewer user-interface components to be rendered by the client in response to the changed operating conditions.

18. The computer program product of claim 16, wherein the information regarding the client further comprises information regarding user-interface components of the application executing on the client the user of the client has interacted with.

19. The computer program product of claim 16, the operations further comprising:

identifying at least one client cluster comprising a plurality of clients each having substantially similar operating conditions as reflected in the information regarding a client provided by each.

20. The computer program product of claim 19, the operations further comprising:

detecting whether an additional client device is a member of the at least one client cluster and, in response to the client being a member of the at least one client cluster, selecting at least one additional component rule from the component rule database, the at least one additional component rule dictating selection of an additional user-interface component different from the retrieved user-interface component.

* * * * *